Aug. 8, 1950  F. W. CHATLOS  2,517,840
CUTTING TOOL
Filed Sept. 21, 1946
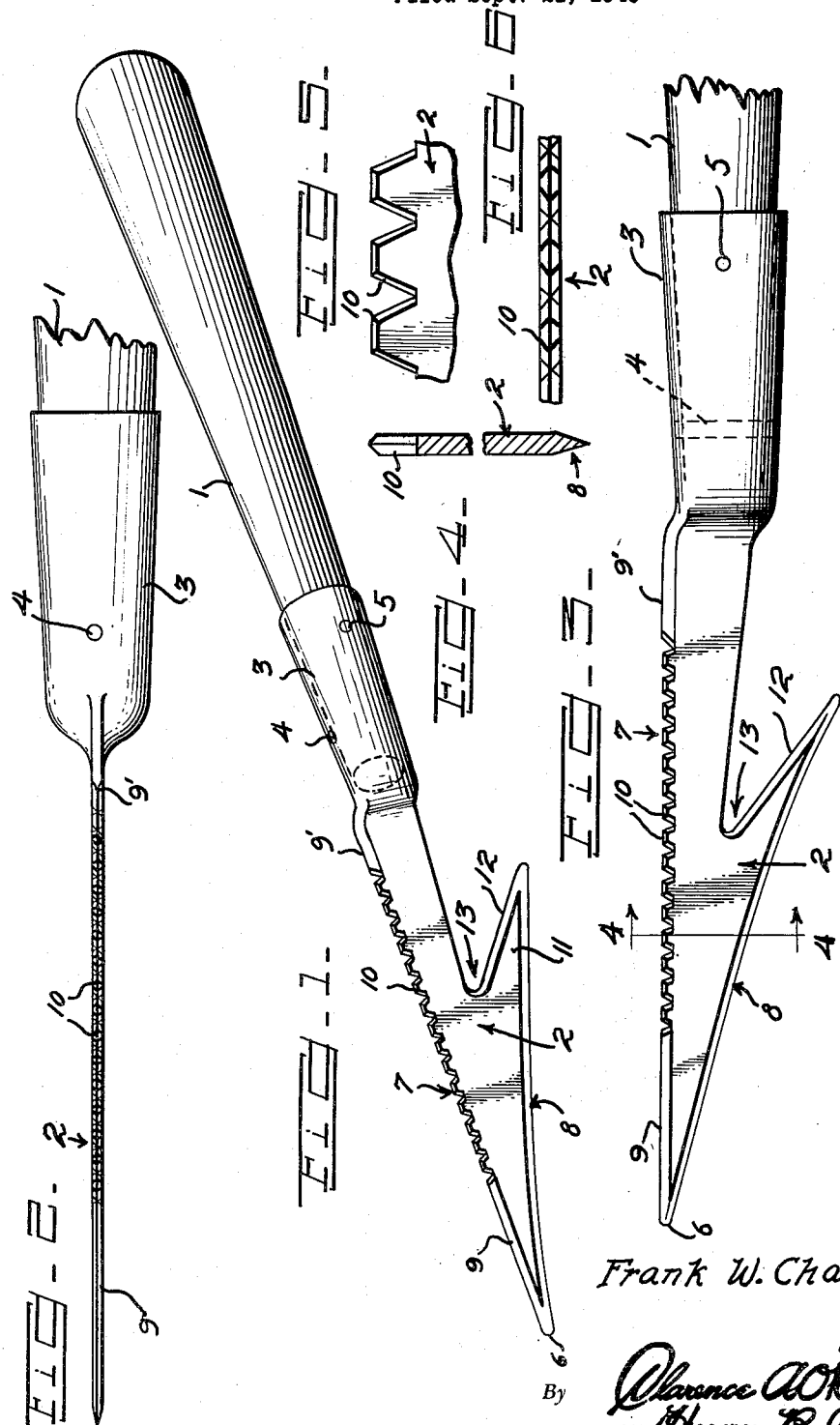
Inventor
Frank W. Chatlos
By Clarence A. O'Brien
and Harvey B. Jacobson
Attorneys Patented Aug. 8, 1950

2,517,840

UNITED STATES PATENT OFFICE 2,517,840

CUTTING TOOL

Frank W. Chatlos, Pine Plains, N. Y.

Application September 21, 1946, Serial No. 698,575

1 Claim. (Cl. 30—314)

My invention relates to improvements in cutting tools for use especially in clearing the working parts of farm machinery of straw, stalks, string, or the like, which has become wound around the same.

The primary object of my invention is to provide a serviceable, inexpensive tool especially adapted for insertion in windings of such matter, as above designated, on shafts and gears and for easy manipulation with a reciprocating motion to cut such matter away without danger to the user of the tool.

Other and subordinate objects, also comprehended by my invention, together with the precise nature of my improvements will be readily understood when the succeeding description and claim are read with reference to the drawing accompanying and forming part of this specification.

In said drawings:

Figure 1 is a view in perspective of my improved tool in the preferred embodiment thereof.

Figure 2 is a view in plan, partly broken away and drawn to a larger scale.

Figure 3 is a view in side elevation partly broken away.

Figure 4 is a view in transverse section taken through the blade on the line 4—4 of Figure 3 and drawn to a larger scale.

Figure 5 is a fragmentary view in side elevation of the teeth, and

Figure 6 is a view in plan of the same.

Reference being had to the drawing by numerals, my improved tool comprises, as its basic elements, a handle 1 and a cutting blade 2.

The handle 1 is of elongated forwardly tapering form, round in cross-section, and preferably formed of hard wood.

The cutting blade 2 has formed integrally therewith a tapered hollow shank 3 which is fitted and sleeved onto the front end of the handle 1 with a wedge fit and fixed thereto by rivets, as at 4, 5. Said cutting blade 2 is of any suitable length and co-planar with the handle 1, with a sharp front point 6 from which relatively long and short side cutting edges 7, 8 diverge rearwardly with respect to each other. The long cutting edge 7 is substantially parallel with the axis of the handle 1 and is formed with a front beveled cutting section 9, a similar shorter, rear cutting section 9', and saw teeth 10 intermediate said sections 9, 9' of truncated cone shape with beveled edges as shown. The short cutting edge 8 is a beveled edge, slightly concave, longitudinally, and forms one side of a rearwardly tapering, sharp pointed barb 11 on said blade having a relatively shorter beveled cutting edge 12 opposite said edge 8. As will be clear, the barb 11 forms a forwardly tapering notch 13 in the blade 2 intermediate the shank 3 and the point 6.

In using the described cutting tool, the point 6 of the blade 2 is shoved into matter wound around a machine part, not shown, with the long cutting edge 10 nearest the machine part. The long and short cutting edges 7, 8 are thus wedged into the winding with both said edges cutting and the teeth 10 tearing. In this connection, it is to be noted that the teeth 10 extend along the long cutting edge 7 opposite a portion of the short cutting edge 8 so that cutting and tearing by opposite sides of the blade 2 is made possible. The cutting blade 2 may be worked back and forth to cause the teeth 10 to saw and the barb 11 to catch in the winding with its cutting edge 12 severing the winding and the barb 11 hooking into the same with a pulling action. Thus, a machine part may be quickly cleared and freed of winding of straw, grass, stalks or other material wound thereon and with little effort and time consumed.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claim.

What I claim is:

A cutting tool comprising a handle, a sharp pointed cutting blade extending from one end of said handle and having relatively long and short opposite cutting edges diverging relatively from said point, and a barb at the rear end of the short cutting edge having a bevel cutting edge intermediate said long and short cutting edges, the long cutting edge having end beveled edge sections and teeth intermediate said sections, the short cutting edge being longitudinally concave, the teeth extending along the long cutting edge opposite a portion of the short cutting edge whereby the blade is adapted to be inserted point foremost in matter wound around a machine part to cut and tear such matter upon opposite sides of the blade.

FRANK W. CHATLOS.

REFERENCES CITED

The following references are of record in the file of this patent:

UNITED STATES PATENTS

| Number | Name | Date |
|---|---|---|
| 934,585 | Trafford | Sept. 21, 1909 |
| 1,398,850 | Franco | Nov. 29, 1921 |
| 2,059,414 | Taylor | Nov. 3, 1936 |

FOREIGN PATENTS

| Number | Country | Date |
|---|---|---|
| 26,155 | Great Britain | Dec. 15, 1905 |